United States Patent [19]

Tjaden

[11] Patent Number: 4,984,667
[45] Date of Patent: Jan. 15, 1991

[54] COUPLING DEVICE

[76] Inventor: Harold M. Tjaden, 221 Delaware, Stilwell, Kans. 66085

[21] Appl. No.: 328,530

[22] Filed: Mar. 24, 1989

[51] Int. Cl.$^5$ .................... F16D 7/02; F16K 35/06; B60R 25/00

[52] U.S. Cl. .................... 192/56 R; 464/46; 180/287; 70/175; 137/384.2; 251/81; 279/36; 279/107

[58] Field of Search ............ 192/56 R; 464/45, 46; 180/287; 70/175, 176; 137/383, 384.2; 251/81, 292; 81/3.44, 53.2; 279/35, 36, 106, 107

[56] References Cited

U.S. PATENT DOCUMENTS

| | | | |
|---|---|---|---|
| 1,366,804 | 1/1921 | Jackson | 137/384.2 X |
| 1,384,369 | 7/1921 | Wiesener | 137/384.2 |
| 1,525,077 | 2/1925 | Kovary | 279/36 X |
| 2,608,377 | 8/1952 | Streun | 251/81 |
| 2,881,789 | 4/1959 | Finazzo | 180/287 X |
| 3,170,579 | 2/1965 | Popelier | 137/383 X |
| 3,441,115 | 4/1969 | Gunther | 192/56 R X |
| 3,687,414 | 8/1972 | Petty | 251/77 |
| 3,718,009 | 2/1973 | Perina | 192/56 R X |
| 4,074,542 | 2/1978 | Hankosky et al. | 192/56 R X |
| 4,360,074 | 11/1982 | Parquet | 180/287 |
| 4,417,644 | 11/1983 | Brogard | 180/287 |
| 4,541,608 | 9/1985 | Forrester et al. | 251/77 |

FOREIGN PATENT DOCUMENTS 1508183  11/1980  United Kingdom ............. 137/384.2

Primary Examiner—Richard Lorence
Attorney, Agent, or Firm—Litman, McMahon & Brown

[57] ABSTRACT

A security device is provided for coupling a rotational input force to an output shaft and includes a tubular housing with first and second ends and an internally-threaded bore extending therebetween. An externally-threaded screw member is threadably and reciprocably received in the housing bore and includes first and second ends. A slip clutch assembly is associated with the screw member second end and is adapted for drivingly innerconnecting the screw member and the output shaft. A socket assembly includes a clamp member with hingedly innerconnected jaws or sections which may be opened for placement over the screw member first end and closed for drivingly interconnecting the clamp member and the screw member. A collar nut may be placed over the clamp member for retaining it in its closed position.

10 Claims, 3 Drawing Sheets

COUPLING DEVICE

BACKGROUND OF THE INVENTION

1. Field of the Invention

The present invention relates generally to security devices, and in particular to a device for coupling an input rotational force with an output shaft.

2. Description of the Prior Art

Security devices are well known and various types have heretofore been designed to restrict access to and use of vehicles, equipment, machinery and other types of property. Among the various types of security devices are padlocks, combination locks, access code security systems and electronic locking devices.

However, even relatively sophisticated security systems are sometimes circumvented. If the protected property has a relatively high value, criminals and others may be motivated to devise methods and equipment to disable or bypass existing security systems.

Security systems generally must strike a compromise between security, i.e. restricting unauthorized access or use, and convenience to authorized users. For example, many motor vehicles have some type of security system, ranging from a simple, keyed locking switch in the ignition system to more elaborate devices which require a user to input a unique access code. However, in spite of the availability of such devices, vehicle theft remains a major crime problem. Cost, of course, is another significant factor since equipment manufacturers and owners are reluctant to add expensive security systems to their equipment and must be convinced that the likely benefits, i.e. preventing theft losses, outweigh the added expense.

A related crime problem involves the theft of construction equipment, including earthworking, excavation, material-handling and paving equipment. One reason that construction equipment is stolen so frequently is that, compared to its relatively high value, it is often relatively easy to steal. For example, on many construction sites, expensive equipment is left unguarded during nonworking hours and can be relatively easily removed. Some construction equipment is so expensive that a thriving criminal enterprise based on stolen construction equipment presently exists. Experience has shown that various ignition switches and mechanical locking devices are easily circumvented by experienced thieves with the proper tools, which are often readily available.

Such widespread equipment theft problems have led to higher theft insurance premiums for construction equipment in general, and particularly the types of equipment that are most commonly considered theft targets.

However, many types of construction equipment include hydraulic systems which, if rendered inoperative, can effectively deter theft. Even construction equipment which is not hydraulically driven can often be effectively secured by placing arms, booms, blades, buckets, etc. in positions that would render it difficult or impractical to remove the equipment. For example, earth moving equipment pieces generally include blades, buckets and the like which can be hydraulically extended or forced against a ground surface. Closing the hydraulic system in this configuration can render removal and transportation of such equipment impractical.

Hydraulic valves are well known, and exemplary valves are shown in the Streun U.S. Pat. No. 2,608,377; Petty U.S. Pat. No. 3,687,414 and Forester et al. U.S. Pat. No. 4,541,608. Such valves, placed at proper locations in hydraulic systems, can be closed to render them inoperative and can be opened for normal operation. Of course, to be effective as a security device, such a valve should be capable of locking in its closed position, which in many valve assemblies involves locking a shaft against rotation.

Therefore, an effective security system should be difficult to circumvent, convenient to activate and deactivate, and relatively inexpensive.

Heretofore, there has not generally been available a security system with the advantages and features of the present invention.

SUMMARY OF THE INVENTION

In the practice of the present invention a security device is provided for coupling a rotatable output shaft with an input rotational force. The device includes an internally-threaded, tubular housing with a coaxial bore extending between first and second ends. An externally-threaded screw member with first and second ends is threadably and reciprocably positioned within the housing bore. A clutch assembly is drivingly connected to the screw member in association with its second end and is also drivingly connected to the output shaft. The output shaft may comprise an actuator shaft of, for example, a valve assembly. A mounting plate is provided for mounting the coupling device at its housing second end to, for example, a valve assembly. The clutch assembly permits the screw member to be turned slightly past a position at which the valve assembly is closed until the screw member second end engages the mounting plate. The screw member may be tightened against the mounting plate whereby the valve member is secured in its closed position. A socket assembly includes a clamp member with first and second ends and a pair of jaws or half sections hingedly interconnected at the first end. The clamp member second end is adapted to open and receive the screw member first end. A collar is provided for placement over the clamp member for retaining it in a closed position on the screw member first end. A wrench can be applied to the socket assembly for rotating the screw member within the housing whereby the valve can be opened and closed.

OBJECTS OF THE INVENTION

The principal objects of the present invention are: to provide a security device; to provide such a device which is adapted for coupling a rotational input force and a rotatable output shaft; to provide such a device which is adapted for use on various types of equipment; to provide such a device which is adapted for, inter alia, locking a hydraulic valve in either a closed or an open position; to provide such a device which is particularly well adapted for protecting construction and other types of equipment which utilize hydraulics; to provide such a device which is economical to manufacture, convenient and efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
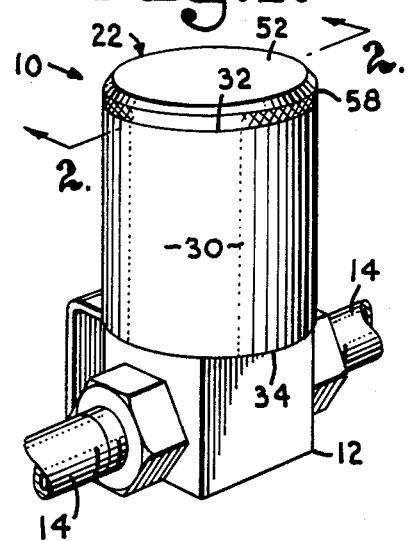
FIG. 1 is a perspective view of a security coupling device embodying the present invention.
Figure 3:
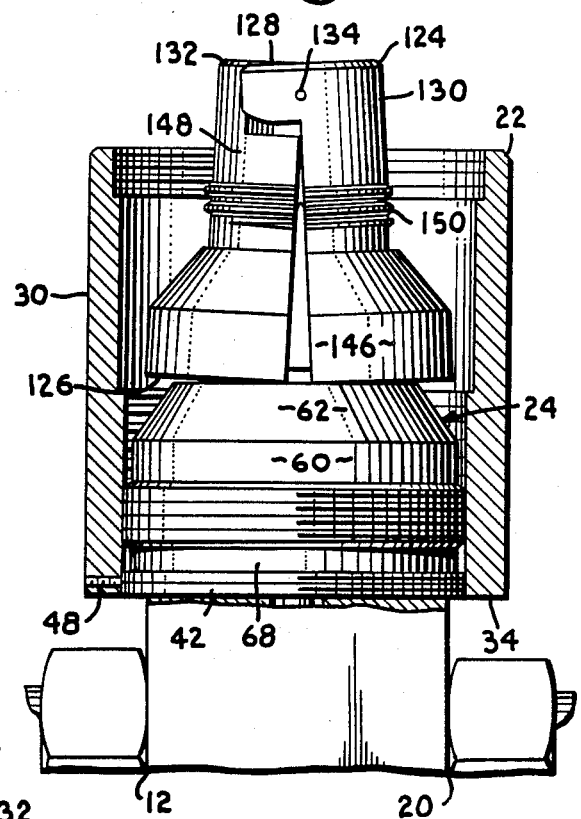
FIG. 3 is a vertical, cross-sectional view of the device, particularly showing a socket assembly for operating it.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates a security coupling device embodying the present invention. Without limitation on the generality of useful applications of the coupling device 10, it is shown and described in connection with a butterfly valve 12 which is installed in series in a fluid conduit 14 and which includes an operable valve disk 16 which is rotatable approximately ninety degrees between fully closed and fully open positions. The disk 16 is connected to a valve actuating shaft 18 which projects upwardly from a valve body 20.

The coupling device 10 generally comprises a housing 22, a screw member 24, a clutch assembly 26 and a socket assembly 28.

II. Housing

The housing 22 includes a cylindrical, tubular body 30 with upper (or first) and lower (or second) ends 32, 34 and a bore 36 extending therebetween. Upper and lower sets of female threading 38, 40 are located in the bore 36 adjacent to the body upper and lower ends 32, 34 respectively, with the lower set of threading 40 extending almost halfway up the body 30. The lower threading 40 has a lesser inside diameter than the upper threading 38.

Figure 2:
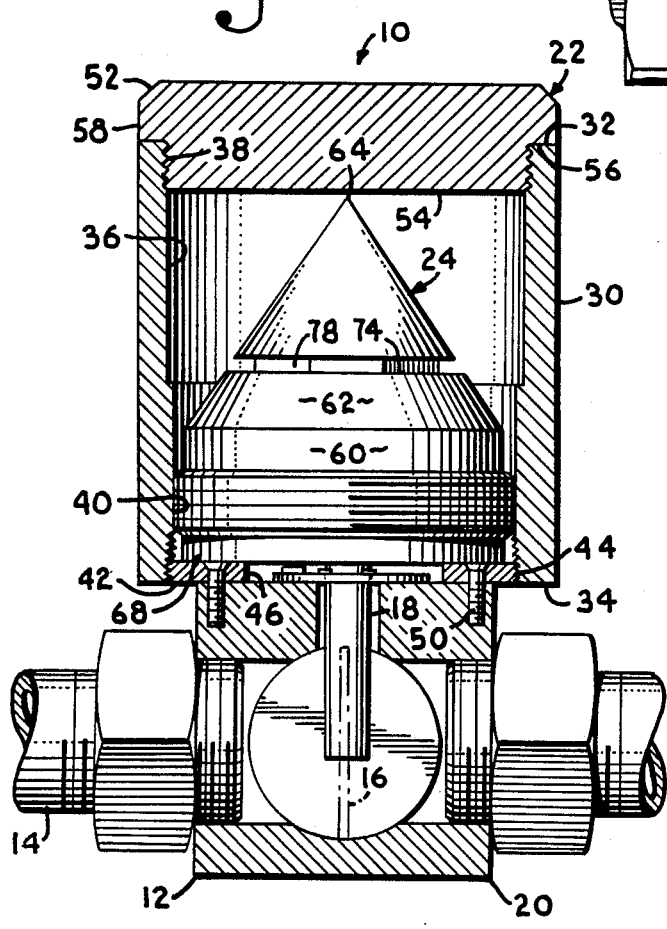
FIG. 2 is a vertical, cross-sectional view of the device, taken generally along line 2—2 in FIG. 1.

An annular, washer-like base plate 42 includes a circumferential outer rim which is male-threaded for placement in the body lower end 34 and a coaxial center opening 46. The base plate 42 may be fixedly secured in the housing bore 36 flush with the housing bore lower end 34 by a locking pin 48, in place of which could be used a set screw or other anti-rotational means. The base plate 42 may be secured to the valve body 20 by suitable countersunk screws 50 (FIG. 2).

A coaxial cap 52 includes a male-threaded insert portion 54 adapted to be threadably received in the body upper threading 38, an annular shoulder 56 adapted for engaging the body upper end 32, and a beveled and knurled rim 58.

III. Screw Member 24

Figure 5:
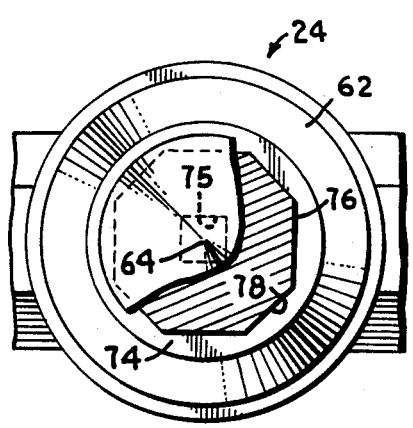
FIG. 5 is a top plan view of the device, particularly showing the inner wall configuration of a screw member groove.
Figure 4:
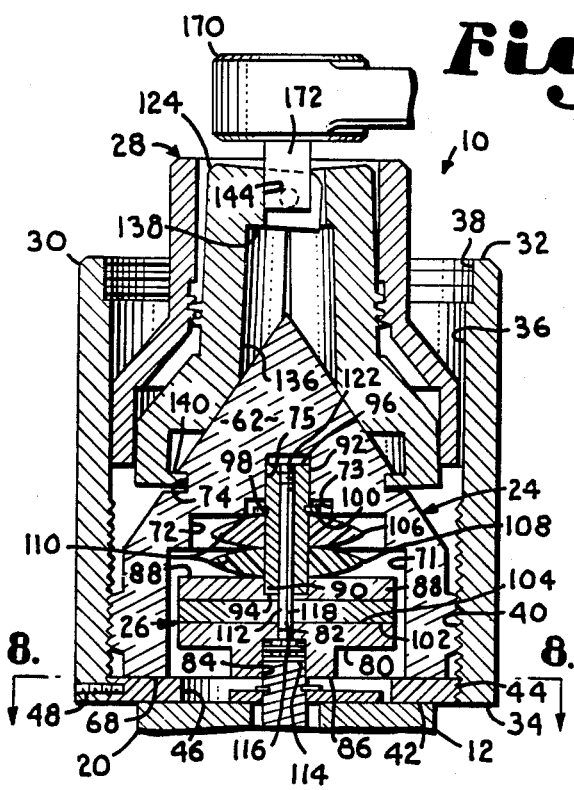
FIG. 4 is a vertical, cross-sectional view of the device with the socket assembly and an actuating tool in place.

The screw member 24 is generally coaxial and includes a lower, male-threaded cylindrical portion 60 and a generally conical upper portion 62 which terminates at an apex 64. A bore 66 is formed in the screw member 24 and is downwardly open at a lower end 68 thereof. The bore includes first, second and third cross-sectional circular counterbores 71, 72 and 73 with respective diameters that decrease progressively upwardly within the bore 66. A bore upper portion or drive shaft receiver 75 has a square cross-sectional configuration (FIG. 5). An annular groove 74 is formed in the screw member upper portion 62 and terminates at an inner wall 78 comprising a plurality, e.g. eight, of flats 76 whereby a horizontal cross-section (FIG. 5) through the screw member 24 at this level defines an octagonal configuration.

IV. Clutch Assembly 26

The clutch assembly 26 is substantially positioned within the screw member 24 and includes a lower (or second) clutch plate 80 with a coaxial receiver 82 including a square cross-sectional receiver counterbore 84 positioned primarily within a downwardly-depending lower clutch plate boss 86. An upper (or first) clutch plate 88 includes a square cross-sectional receiver 90 which is substantially aligned with the lower clutch plate counterbore 84 and the screw member drive shaft receiver 75.

The lower clutch plate counterbore 84 receives the valve actuating shaft 18 in a rotational force-transmitting relationship. The screw member drive shaft receiver 75 and the upper clutch plate receiver 90 receive a cross-sectional square coupling drive shaft 92 in a rotational force-transmitting relationship. The drive shaft 92 includes a lower end 94 received in the upper clutch plate receiver 90 and an upper end 96 received in the screw member bore 66. The drive shaft 92 includes a notch 98 in spaced relation below its upper end 96 for receiving a keeper 100, e.g. a C-ring. The keeper 100 is adapted to be received in the screw member third counterbore 73.

A friction disk 102 is attached to an inner clutch plate face, e.g. the upper face of the lower clutch plate 80, by an adhesive layer 104. The friction disk 102 is thus fixedly attached to an inner face of one of the clutch plates 80 or 88, and is in frictional, sliding engagement with the inner face of the other clutch plate. The friction disk 102 can comprise a frictional material such as brake lining material.

Upper and lower pairs 106, 108 of Belleville washers 110 are compressed between the keeper 100 and the upper clutch plate 88. A clutch bolt 112 includes a head 114 received in the lower clutch plate counterbore 84 with a washer 116; a smooth shank 118 rotatably extending through the lower clutch plate receiver 82, the friction disk 102, the upper clutch plate receiver 90 and a lower portion of a drive shaft bore 120; and a threaded end 122 threadably received in an upper, threaded portion of the drive shaft bore 120. The clutch bolt upper end 122 is preferably fixedly secured in the drive shaft bore 120 by suitable fastening means, e.g. epoxy adhesive, welding, etc. By fixedly securing the clutch bolt upper end 122 within the drive shaft bore 120, the clutch bolt 112 is prevented from threadably advancing into or retracting from the drive shaft 92. The washer 116, which may comprise nylon or a similar material with a low coefficient of friction, permits relative rotation between the clutch bolt 112 and the lower clutch plate 80, such as might occur when the clutch assembly 26 slips.

The Belleville washers 110 exert expansive forces on the keeper 100 and the upper clutch plate 88, which expansive forces are counterbalanced by compressive forces exerted on the friction disk 102 by and between the clutch plates 80, 88. The magnitude of such expansive washer forces and compressive clutch plate forces is adjustable with the clutch bolt 112, although normally it will be set, fixedly secured in the drive shaft 92, and for normal operation may not require adjustment thereafter.

V. Socket Assembly 28

The socket assembly 28 includes a clam shell-type, bifurcated clamp member 124 with lower (or second) and upper (or first) ends 126, 128 and first and second clamp jaws or sections 130, 132 hingedly connected by a pivot pin 134 at the clamp member upper end 128. A clamp member bore 136 is open at the lower end 126 and terminates at a blind upper end 138 in spaced relation below the clamp member upper end 128. At the clamp member lower end 126 the bore 136 is partially restricted by an annular key flange 140, which projects radially inwardly partway into the bore 136. The key flange 140 includes key flats 142 (e.g. eight in number) which correspond to the eight flats 76 of the screw member annular groove 74.

A cross-sectional square socket receiver 144 extends coaxially into the clamp member 124 and is open at its upper end 128. The clamp member 124 includes a flared or frusto-conical lower portion 146 and a generally cylindrical upper portion 148 with external, male threading 150. The threading 150 may include two leads.

A collar nut 152 includes lower and upper ends 154, 156; a flared or frusto-conical lower portion 158; and a generally cylindrical, knurled-surface upper portion 160. The collar nut 152 includes a coaxial bore 162 extending between and open at the ends 154, 156. The bore 162 includes an enlarged lower portion 164 and a generally cylindrical upper portion 166 with internal, female threading 168, which may also include two leads for threadably engaging the clamp member threading 150.

The socket assembly 28 may be actuated by a socket wrench 170 (not forming a part of this invention) with a cross-sectional square drive stub or shaft 172 adapted to be drivingly received in the socket receiver 144.

VI. Operation

In operation, the coupling device 10 is adapted for mounting on various structures to which access is preferably limited. For example, the coupling device 10 may be used to limit access to the valve 12. In particular, the coupling device 10 is useful for restricting access to equipment which is rotationally actuated, such as the valve 12.

Figure 9:
FIG. 9 is an exploded, bottom perspective view of the device, particularly showing the socket assembly and the screw member thereof.
Figure 6:
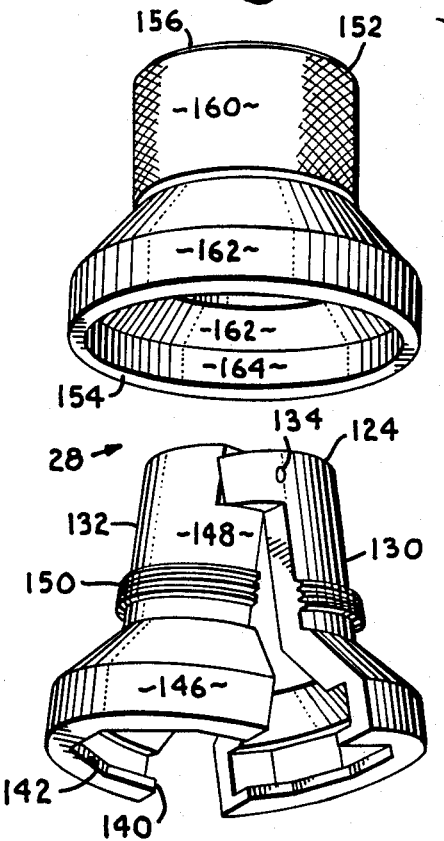
FIG. 6 is a top plan view of a clamp member of the socket assembly.
Figure 7:
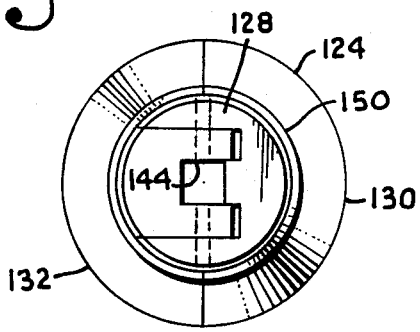
FIG. 7 is a bottom plan view of the clamp member.
Figure 7:
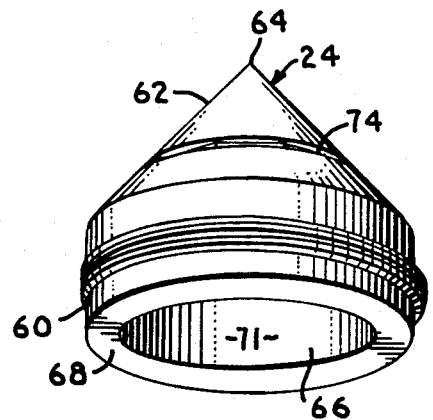
Figure 8:
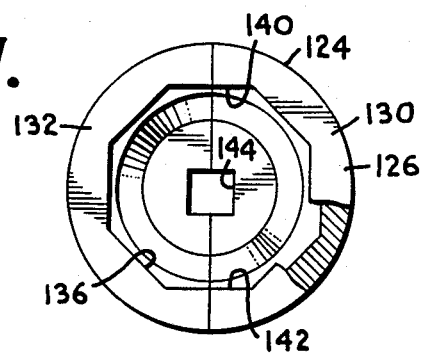
FIG. 8 is a horizontal, cross-sectional view of the device taken generally along line 8—8 in FIG. 4.
Figure 10:
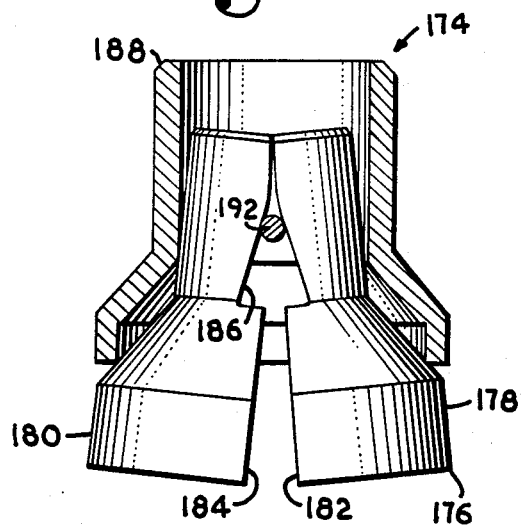
FIG. 10 is a side elevational view of a modified socket assembly for use with a coupling device embodying the present invention, shown in an open position thereof.
Figure 11:
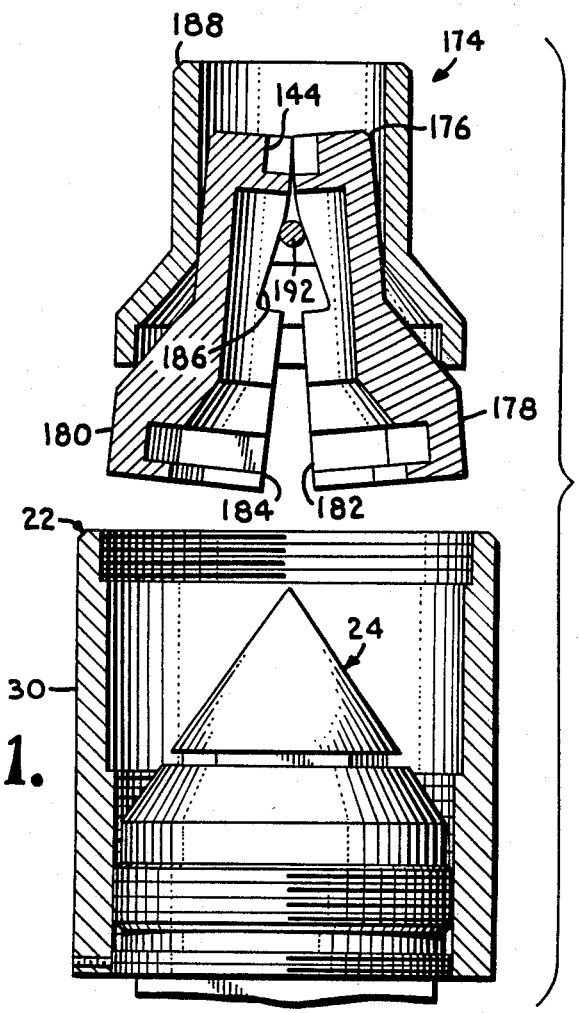
FIG. 11 is a vertical cross-sectional view of the coupling device with the modified socket assembly in its open position.

To close the valve 12, the following procedure is followed: 1) remove the cap 52; 2) open the jaws 130, 132 of the clamp member 124 (FIG. 9); 3) place the clamp member 124 over the screw member upper portion 62 until the clamp member key flange 140 aligns with the screw member groove 74; 4) close the clamp member jaws 130, 132, thereby engaging the clamp member key flats 142 with the screw member flats 76; 5) threadably screw the collar nut 152 down over the clamp member 124 until their respective upper ends 128, 156 are substantially flush; 6) engage the clamp member 124 with the socket wrench 170; 7) rotate the socket wrench 170 clockwise, thereby threadably lowering the screw member 24 and turning the valve actuating shaft 18; 8) rotate the valve actuating shaft 18 to its closed position (many of such valves have open and closed positions which are approximately ninety degrees apart); and 9) continue rotating the screw member 24 until its lower end 68 engages the housing base plate 42.

The clutch assembly 26 functions as a rotational coupling or rotational drive connecting device during movements of the valve 12 between its open and closed positions. When the valve 12 reaches an open or a closed position, the clutch assembly 26 is adapted to slip whereby the screw member 24 can be rotated farther, although antirotational resistance will be encountered due to the frictional engagement between the friction disk 102 and the upper clutch plate 88. This procedure for rotating the screw member 24 through a rotational arc of greater magnitude than the rotationl arc of the valve actuating shaft 18 insures a positive clamping of the screw member 24 against the housing base plate 42. More specifically, it can be desirable to clamp the screw member 24 quite tightly against the base plate 42 for security reasons. With the screw member 24 tightly jammed against the base plate 42, it will be appreciated that the screw member 24 would prove quite difficult to rotate without the socket assembly 28. The conical configuration of the screw member upper portion 62 would render it quite difficult to clamp or engage the screw member 24 with enough force to rotate it, except by using the socket assembly 28.

When opening the valve 12, the procedure is substantially the reverse of that described above in connection with closing it. When the valve 12 reaches its full open position, the clutch assembly 26 will permit the screw member 24 to be threadably withdrawn or raised farther through a slip-clutch action. In this event, the clutch assembly 26 will be slipped again when the screw member 24 is turned clockwise past the point at which the valve 12 is fully reclosed until the screw member lower end 68 firmly engages the base plate 42.

It will be appreciated that the slip-clutch feature described herein permits the screw member 24 to be subjected to considerable torque in the process of tightening it against the base plate 42, to achieve a relatively high degree of security with the coupling 10. Different couplings 10 may be provided with screw member groove inner walls 78 and clamp member key flanges 140 having various configurations, which may be unique for each matched set of coupling device components. The groove inner walls 78 and the key flanges 140 can assume various configurations, their function being to impart rotational force between the socket assembly 28 and the screw member 24.

With the screw member 24 in its lower, locked position (i.e. with the valve 12 closed) the screw member apex 64 is positioned slightly below a bottom surface of the cap insert portion 54, e.g. about one-half inch. For security purposes, it is desirable the screw member 24 positioned well down in the interior of the housing 22 to inhibit unauthorized access thereto.

VII. Alternative Embodiment

Figure 12:
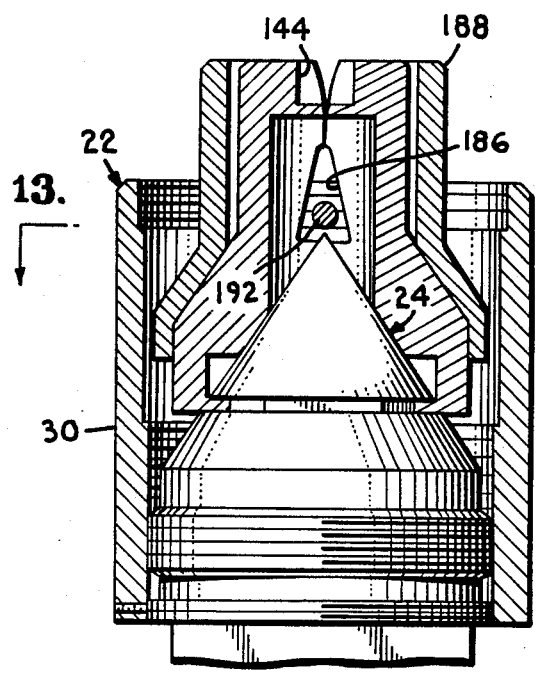
FIG. 12 is a vertical cross-sectional view of the coupling device with the modified socket assembly in a closed, engaged position thereof.
Figure 13:
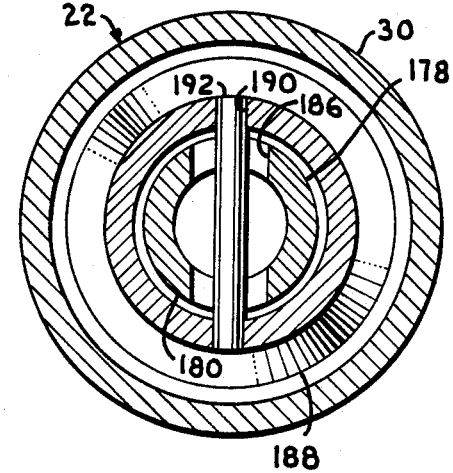
FIG. 13 is a horizontal, cross-sectional view of the coupling device taken generally along line 13—13 in FIG. 12.

The reference numeral 174 generally designates an alternative, modified socket assembly for the coupling device 10 embodying the present invention (FIGS. 10-13). The modified socket assembly 174 includes a clamp member 176 with first and second jaws 178, 180 which engage each other at respective first and second mating surfaces 182, 184 with the clamp member 176 in a closed position (FIG. 12). A pair of socket pin receivers 186 are formed in diametrically opposed relation on opposite sides of the clamp member 176, each receiver 186 having a tapered, top-to-bottom expanding configuration.

A collar nut 188 telescopically receives the clamp member 176 and includes a pair of diametrically opposed socket pin receivers 190. A socket pin 192 extends transversely through the aligned clamp member and collar nut socket pin receivers 186, 190. The socket pin 192 has a diameter slightly less than the widths of lower portions of the clamp member socket pin receivers 186, and slightly greater than widths of upper portions of the socket pin receivers 186. Thus, raising the collar nut 188 raises the socket pin 192 within the clamp member socket pin receivers 186, thereby spreading the jaws 178, 80 to permit the socket assembly 28 to be placed on and removed from the screw member 24.

It is to be understood that while certain forms of the present invention have been illustrated and described herein, it is not to be limited to the specific forms or arrangement of parts described and shown.

What is claimed and desired to be secured by Letters Patent is as follows:

1. A device for transmitting an input rotational force to an output shaft, which device comprises:
 (a) a tubular housing including a bore with internal threads;
 (b) a screw member including:
  (1) a first end with a substantially conical or frusto-conical configuration;
  (2) a second end;
  (3) external threads threadably engaging said housing internal threads whereby said screw member is threadably and reciprocably mountable within said housing bore; and
  (b 4) an outwardly-open annular groove at its first end;
 (c) slip clutch means for interconnecting said screw member and said output shaft; and
 (d) socket means adapted for receiving a portion of said screw member first end and including a flange receivable in said groove.

2. A device for transmitting an input rotational force to an output shaft, which device comprises:
 (a) a tubular housing including a bore with internal threads;
 (b) a screw member including first and second ends and external threads threadably engaging said housing internal threads whereby said screw member is threadably and reciprocably mountable within said housing bore, said screw member further including a coxial bore open at said second end;
 (c) slip clutch means positioned substantially within said screw member cooxial bore for interconnecting said screw member and said output shaft;
 (d) socket means adapted for receiving a portion of said screw member first end and including engagement means adapted for drivingly engaging said screw member; and
 (e) said screw member including engagement means adapted for driving engagement by said socket means.

3. The coupling device according to claim 2 wherein said clutch means comprises:
 (a) a first clutch plate drivingly connected to said screw member;
 (b) a second clutch plate drivingly connected to the output shaft; and
 (c) friction means between said clutch plates for frictionally innerconnecting said clutch plates.

4. The device according to claim 3 wherein said clutch means includes:
 (a) spring means for biasing one said of clutch plates toward the other of said clutch plates.

5. The device according to claim 4 wherein said clutch means includes:
 (a) a coaxial clutch shaft with a first end drivingly connected to said screw member and a second end drivingly connected to said first clutch plate; and
 (b) said spring means surrounding said clutch shaft and being compressively installed between said screw member and said first clutch plate.

6. The device according to claim 5 wherein:
 (a) said spring means comprises a Belleville spring.

7. The device according to claim 2 wherein:
 (a) said screw member first end has a substantially conical or frusto-conical configuration.

8. The device according to claim 7, which includes:
 (a) said screw member having an outwardly-open annular groove at its first end; and
 (b) said socket means being adapted for receiving a portion of said screw member first end and including a flange receivable in said groove.

9. The device according to claim 8 wherein said socket means comprises:
 (a) a bifurcated clamp member including first and second ends and a pair of jaws, said clamp member jaws being pivotally connected at said clamp member first end;
 (b) said clamp member having a bore open at said clamp member second end and adapted to receive said screw member first end;

(c) said clamp member having an open position with said bore open for insertion of said screw member first end thereinto and a closed position with said flange received in said groove; and (d) said flange being positioned at said clamp member second end.

10. The device according to claim 9 wherein said socket means includes:

(a) a collar with a coaxial collar bore adapted to receive said clamp member first end, said collar being adapted to retain said clamp member in its closed position.

* * * * *